Feb. 10, 1948.  R. S. CHILDS  2,435,709
MEANS FOR REPRODUCING MOTION
Filed May 22, 1944
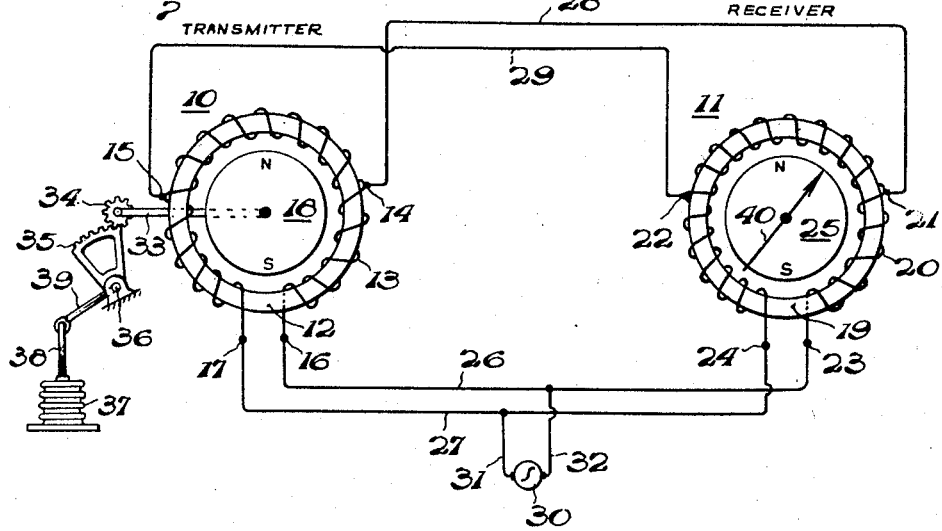
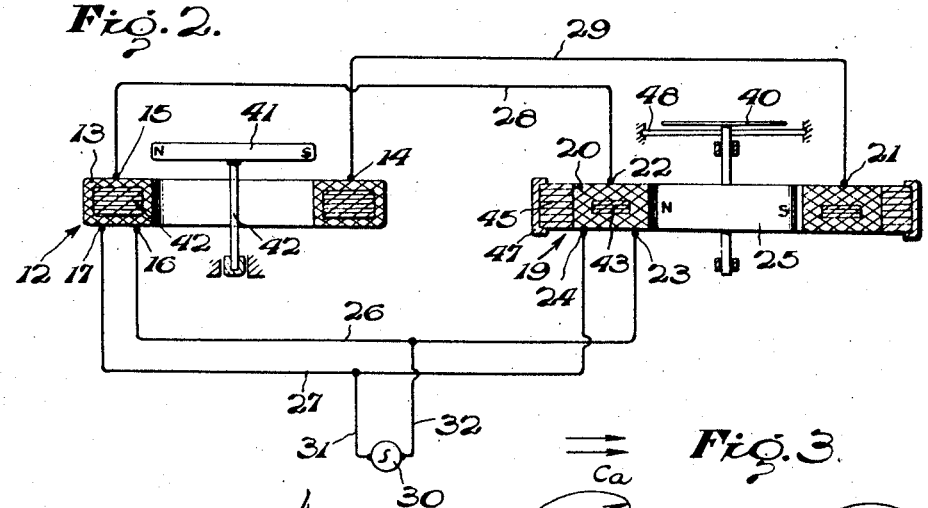
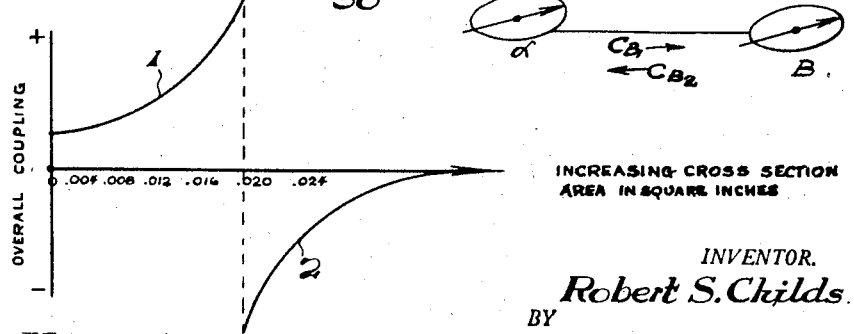
INVENTOR.
Robert S. Childs.
BY
ATTORNEY Patented Feb. 10, 1948

2,435,709

UNITED STATES PATENT OFFICE 2,435,709

MEANS FOR REPRODUCING MOTION

Robert S. Childs, Englewood, N. J., assignor to Bendix Aviation Corporation, Teterboro, N. J., a corporation of Delaware Application May 22, 1944, Serial No. 536,795

8 Claims. (Cl. 318—24)

The present invention relates generally to apparatus for reproducing motion occurring at one point at another and distant point and, more particularly, constitutes a novel improvement over the invention disclosed and claimed in U. S. Patent No. 2,342,637, issued February 29, 1944.

Apparatus of this nature generally comprises a pair of similar electromagnetic devices, one of which is a transmitter and the other a receiver, and each of which comprises a wound stator cooperating with a magnet rotor having no winding thereon. Such apparatus is especially adapted for remote indication, i. e., for measuring the value of a factor at one point by means of some suitable measuring instrument and then transmitting that value to and indicating it at another and remote point, but may be used as well for remote control of other objects at the remote point if so desired. In view of the fact that a certain amount of bearing friction, etc., is present at the receiver and that no separate amplification is provided for the torque generated at the transmitter, the torque available at the receiver is necessarily limited and this limitation manifests itself in a relatively sluggish response on the part of the receiver indicator.

The hitherto known method for increasing the overall torque gradient of known systems without resorting to direct torque amplification by the use of vacuum tube amplifiers, for example, has been to increase each of the two couplings of the system, i. e., the magnetic coupling between the earth's magnetic field and the magnetic element of the transmitter when the system is applied to remote compass indication and/or control, and the effective electrical coupling between the transmitter and the receiver. However, in a conventional system of the character described, the overall torque gradient can be no greater than the torque gradient of component couplings so that, in any event, the overall torque gradient is limited by the coupling of the magnetic element of the transmitter to the earth's magnetic field. Increasing the latter coupling has the marked disadvantages that excessively large magnetic elements at the transmitter are required thereby causing increasingly large dynamic errors in actual operation.

The present invention contemplates the provision of a novel remote indicating and/or controlling system whereby the disadvantages surrounding known apparatus of this character have been overcome and, moreover, one wherein a restoring torque gradient is available at the receiver or indicator that is greater than the torque gradient acting to orient the rotor at the transmitter, the practical effect being that the indicator or control element at the receiver responds substantially instantaneously to any signal appearing at the transmitter. This novel and desirable effect is obtained in the system shown in the above referred to U. S. patent without resorting to any obvious means of amplification by properly choosing the proportions of the elements of the system. Where the system is applied to remote compass indication, for example, the above feature is highly desirable in that it makes possible improved indicator operation with a high indicator torque gradient without increasing the torque gradient at the transmitter.

An object of the present invention, therefore, is to provide a novel remote indicating and/or controlling system wherein for a given effective torque gradient available at the transmitter a much higher torque gradient is available at the receiver without the use of separate torque amplification expedients.

Another object of the invention is to provide a novel remote indicating and/or controlling system wherein notwithstanding the bearing friction, etc., at the receiver, the response on the part of the indicator or control element thereat is substantially instantaneous to any and all signals appearing at the transmitter.

A further object is to provide a novel telemetric system wherein means are provided for causing a shift in the phase of the induced voltages at the transmitter with respect to the induced voltages at the receiver whereby a substantially instantaneous response is derived at the receiver due to motion at the transmitter.

Another object is to provide a novel remote indicating and/or controlling system of the character described wherein the flux densities in the transmitter core are made to differ from the flux densities in the receiver core whereby for a given torque gradient acting on the transmitter a different and much higher torque gradient is available at the receiver.

In addition to possessing the advantage of having a relatively high torque gradient available at the receiver with a relatively weak magnetic element at the transmitter, the novel system of the present invention possesses several other remarkable characteristics. The apparent coupling between the transmitter and receiver may be varied to differ considerably from the apparent coupling between the receiver and transmitter. In fact, with a suitable differential in these two apparent couplings, it is possible, by the present invention, to provide a system with a perfectly stable overall negative torque gradient, heretofore impossible of attainment. A further characteristic of the system when designed in this fashion and applied to a remote compass system is to provide an increasing torque gradient at the receiver as the strength of the orienting field at the transmitter is reduced. This latter characteristic is particularly desirable when the system is applied to a magnetic compass for repeating its indication in a latitude where the earth's magnetic field is inherently weak.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts through the several views;

Figure 1 is a diagrammatic illustration of one embodiment of the present invention as applied to a contractible and expansible bellows located at one point for reproducing its motion at another and distant point;

Figure 2 is an illustration similar to that of Figure 1 showing another embodiment of the invention as applied to a magnetic compass element with the transmitter and receiver, shown in cross-section, constructed in accordance with the present invention;

Figure 3 is a schematic illustration showing the relationship of the effective coupling of the transmitter rotor to the driving bellows of Figure 1 or to the earth's magnetic field, in the case of Figure 2, and the apparent coupling between the transmitter and receiver rotors; and, Figure 4 comprises a set of curves illustrating the relation of the effective coupling of the transmitter rotor to its driving force with respect to a progressively varying cross-sectional core area of the transmitter, such variation being one method of carrying out the present invention.

Considered generally, conventional systems of the type illustrated by the aforementioned patent and by U. S. Patent No. 2,269,602, issued January 13, 1942, have relied upon similar or interchangeable units acting as transmitters or receivers of the system. One distinct disadvantage has been that due to bearing frictions, etc., at the receiver considerable motion had to occur at the receiver to actuate its pointer or control element. The lag created thereby between the transmitter and the receiver could be overcome only by providing a greater torque gradient at the receiver. As pointed out before, in order to develop a relatively greater torque gradient at the receiver it was necessary to provide a greater coupling between the transmitter rotor and its activating force and the manner of accomplishing such effect in the case where the system was applied to remote compass indication, for example, was to enlarge the magnetic element which immediately injected other disadvantages into the system.

It has been discovered by the present invention, however, that by causing a shift in the phase of the induced voltages in the transmitter winding with respect to the induced voltages in the receiver winding or by varying the time phase of the flux densities in the transmitter core relative to the time phase of the flux densities in the receiver core, that a much greater torque gradient was available at the receiver than that acting at the transmitter, the effect being that the torque gradient was amplified without increasing the actual coupling between the transmitter rotor and its activating force. Stated in another manner, even though the actual coupling between the transmitter magnet and its activating force was not increased, the deliberate attempt to make the transmitter and receiver dissimilar, produced the effect that the apparent or effective coupling between the transmitter magnet and its activating force had been increased. It has been conclusively established by exhaustive tests and experiments that even though the actual coupling between the transmitter magnet and its activating force remains constant, changing the time phase of the induced voltages or the flux densities in the transmitter or receiver, or both, increases the effective coupling between the transmitter rotor and receiver rotor, thereby increasing the torque gradient available at the receiver.

For a clearer understanding of the present invention it will be advantageous to consider the overall torque gradient of the system as consisting of two distinct functions, i. e., one being the coupling between the transmitter rotor and its activating force (measuring instrument 37 of Figure 1 or the earth's magnetic field in Figure 2), and the other being the electrical torque gradient between the transmitter and the receiver indicator. It is well known that the overall torque gradient of such a system is equal to the product of the component gradients divided by their sum, i. e., the product of the electrical torque gradient and the torque gradient resulting from the coupling between the transmitter rotor and its activating force divided by the sum of the two last-named gradients.

Referring to Figure 3 of the drawings, the component gradients are $C\alpha$, the gradient acting to orient the transmitter rotor, $C\beta_1$, the gradient between the indicator rotor and the transmitter rotor, and $C\beta_2$, the coupling between the transmitter rotor and indicator rotor in the reverse direction. When a torque, $\tau$, is applied to the indicator rotor, the relative rotation of the indicator rotor with respect to the transmitter rotor is, $$\beta - \alpha = \frac{\tau}{C\beta_1} \qquad (1)$$

from which $$\alpha = \beta - \frac{\tau}{C\beta_1} \qquad (2)$$

But the displacement of the transmitter rotor with respect to the activating force or the orienting prime mover is, $$\alpha = \frac{(\beta - \alpha)C\beta_2}{C\alpha} \qquad (3)$$

Equating Equations 2 and 3

$$\beta - \frac{\tau}{C\beta_1} = \frac{(\beta - \alpha)C\beta_2}{C\alpha} \qquad (4)$$

Substituting Equation 1 in 4 for $\beta - \alpha$ $$\beta - \frac{\tau}{C\beta_1} = \frac{\tau}{C\beta_1} \frac{C\beta_2}{C\alpha} \qquad (5)$$

From which $$\beta = \frac{\tau}{C\beta_1}\left(\frac{C\beta_2}{C\alpha} + 1\right) \qquad (6)$$

or $$\frac{\tau}{\beta} = \frac{C\beta_1}{1 + \frac{C\beta_2}{C\alpha}}$$

But the apparent overall coupling is $$C = \frac{\tau}{\beta} \qquad (7)$$

so that $$C = \frac{C\beta_1}{1 + \frac{C\beta_2}{C\alpha}} \qquad (8)$$

In hitherto known systems the design was such as to make $C\beta_1=C\beta_2$ which is substantially true when both transmitter and receiver are identical units. In this type of operation, even though $C\alpha$ be made infinitely large, the apparent overall coupling is limited to $C\beta_1$. When the design is altered in the novel manner herein described, $C\beta_1$ can be increased and at the same time $C\beta_2$ is decreased. This can be carried out until $C\beta_2$ reaches zero and continues on in a negative sense. Another way of understanding such a result is to consider clockwise rotation of the transmitter to cause clockwise rotation of the receiver but clockwise rotation of the receiver to cause counter-clockwise rotation of the transmitter. When $C\beta_2=-C\alpha$, the overall coupling C will be infinite. Furthermore, decreasing $C\beta_2$ will produce an effectively negative overall coupling. This latter characteristic may be observed by hanging a weight on the pointer of the receiver and finding that the weight will be lifted. If the weight is hung at a greater moment arm the weight will rise higher.

Any change in the magnetic circuit which causes the even harmonic voltages developed in the transmitter to lag in time phase the even harmonic voltages in the receiver will produce a $C\beta_1$ larger than $C\beta_2$. Differences in fundamental flux density produced with dissimilar windings, dissimilar magnetic cores, or dissimilar magnet rotors will all produce the present effect although any combination of such changes will work as will be understood by those skilled in the art. An important distinction of the novel system of the present invention is that it was heretofore believed from theoretical considerations that optimum operation would be obtained with perfect phasing of flux densities and voltages in both the transmitter and the receiver. The present invention, however, shows that this is distinctly not the case.

One manner of accomplishing the novel and desirable results hereinabove described is to provide a transmitter whose cross-sectional stator core area is greater than the cross-sectional stator core area of the receiver. The method of arriving at the desired relation between the transmitter and receiver core areas was to run a series of tests utilizing one receiver having a predetermined cross-sectional core area, i. e., .010 square inch, and a series of transmitter cores having increasingly larger cross-sectional area, beginning with no core at all, whereby the overall torque gradients were obtained. In each case, the overall torque gradient between the indicator and the activating force at the transmitter was obtained by applying a standard weight at some fixed moment arm on the indicator and the angular deflection of the indicator was then observed. As a result of the foregoing it was determined, that as the cross-sectional core area of the transmitter was increased from .004 square inch to .020 square inch, the overall coupling increased progressively, as illustrated by curve 1 of Figure 4, until with a core having a cross-sectional area of .020 square inch the effective coupling became infinite. In other words, with a core of such size, the rotor of the indicator remained stationary upon addition of weight to the indicator pointer. Thereafter, a continued progressively increasing cross-sectional core area developed an effective negative coupling varying from infinity to zero as represented by curve 2 of Figure 4. The presence of the negative coupling was manifested by the fact that with the addition of the weight to the pointer the weight was lifted thereby.

As shown in Figure 1 of the drawings, the apparatus for carrying out the present invention comprises a transmitter 10 electrically connected with a receiver 11, the transmitter having an annular stator 12 provided with a single coil 13 which is tapped at two points 14, 15 intermediate the ends 16, 17 of the coil, the ends and the tapped points being angularly spaced one hundred and twenty (120°) degrees apart along the circumference of coil 13.

Concentrically arranged within stator 12 of the transmitter and in magnetic relation therewith and with coil 13 is a rotor 18 in the form of a magnetic member of marked polarity, as for example, a rotatable permanent magnet having north and south poles as indicated at N and S, providing a uni-directional magnetic flux which enters the stator.

The receiver is located at the remote point and comprises an annular stator 19 having wound thereon a single coil 20 which is also tapped at two points 21, 22 intermediate the ends 23 and 24 thereof. As in the case of the transmitter coil, the ends and the tapped points of the receiver coil are angularly spaced one hundred twenty degrees (120°) apart along the circumference of stator 19. The rotor of the receiver also comprises a rotatable permanent magnet 25 in the form of a disc one-half of which constitutes a north pole and the other half a south pole thereby providing a uni-directional magnetic flux which enters stator 19.

The ends 16, 17 of transmitter coil 13 are electrically connected to the ends 23, 24 of the receiver coil 20 by means of conductors 26 and 27, while the tapped points 14, 15 of coil 12 are electrically connected to the corresponding tapped points 21, and 22 of coil 20 by means of conductors 28 and 29. So arranged, tapped points 14, 15 of coil 13 and points 21, 22 of coil 20 constitute, in effect, polyphase connections, while ends 16, 17 and 23, 24 of said coils constitute single phase connections. Both the transmitter and the receiver coils are energized by either a single phase alternating current or a pulsating direct current from a suitable source 30 connected to conductors 26, 27 by means of leads 31 and 32.

Rotor magnet 18 of the transmitter may be actuated in the manner shown in the hereinabove referred to U. S. Patent No. 2,342,637, i. e., a drive shaft 33 connected to rotor 18 at one end carries at its other end a pinion 34 for meshing with a gear sector 35, pivoted at 36, and connected to a measuring instrument such, for example, as an evacuated bellows or altimeter aneroid 37 by means of a link 38 and a lever 39. Expansion or contraction of aneroid 37 produces corresponding angular motion of rotor 18 which results, in the manner fully described in the last-mentioned patent, in corresponding angular motion of receiver rotor 25, the latter having a pointer 40 connected thereto for operation over a suitable scale (not shown).

The novel system of the present invention has been shown in Figure 1 as applied to a measuring instrument with a definite mechanical coupling between the instrument per se and the transmitter rotor. It can, however, be applied equally as well to reproducing remote compass indication. To this end, therefore, the system of Figure 2 is provided which comprises an angularly movable compass needle 41, in place of rotor magnet 18 of Figure 1, responsive to the earth's magnetic field and supported by a shaft 42 whereby the needle may orient itself in the earth's field, the needle being axially displaced from the transmitter stator in order to minimize shielding of the needle by the stator. Although shown as a simple compass needle, it is to be understood that needle 41 may constitute a part of a magnetic compass in the same manner as disclosed in the aforementioned U. S. Patent No. 2,342,637.

As shown more clearly in Figure 2, the stators 12 and 19 of the transmitter and receiver of Figure 1, comprise annular permeable cores 42 and 43 having the coils 13 and 20 wound thereon, core 42 being shown with a cross-sectional area greater than the area of the receiver core. As pointed out before, it has been determined that one manner of obtaining the desired result was to have a receiver whose core area was substantially .010 square inch and a transmitter whose core area was substantially .020 square inch.

Stator 19 of the receiver is also provided with a laminated annular member 45 of magnetic material which serves to provide a return path for the second harmonic flux produced in core 43, the laminations being held together by a retainer 47. Member 45 also serves as a magnetic shield to prevent interaction with other external magnetic fields.

When relative rotation of needle 41 takes place in azimuth under the influence of the earth's magnetic field, such rotation is reproduced at the receiver by rotor 25 and is indicated by pointer 40 on a scale 46 which is calibrated as a compass rose to indicate the direction of the earth's magnetic field as determined by needle 41 at the transmitter.

By making the cross-sectional core area of the transmitter greater than the cross-sectional core area of the receiver, as hereinabove described, the apparent coupling between the transmitter rotor and the aneroid 37 of Figure 1, or the magnetic field acting upon needle 41 of Figure 2, may be made infinite with the consequent result that an apparent rigid coupling is developed between the transmitter and the receiver whereby minute signals developed at the transmitter are substantially instantaneously reproduced at the receiver notwithstanding the bearing friction and other forces acting on the pointer or control element at the receiver.

It will now be apparent to those skilled in the art that by the present invention there has been provided a novel and simple apparatus for accurately and rapidly reproducing motion at a remote point, whether the motion to be reproduced is that of the needle of a magnetic compass or whether engine functions such as, for example, engine temperature, fuel pressure, oil pressure, fuel level, etc., are to be indicated at the remote point.

Although several embodiments of the present invention have been illustrated and described in detail, it is to be expressly understood that the invention is not limited thereto. For example, it may be desired, in some installations to have receivers whose cross-sectional core areas vary from that herein stated and in such event the cross-sectional core areas of the transmitter will be varied correspondingly whereby a substantially infinite effective coupling is maintained between the transmitter and the receiver. Various other changes may be made in the design and arrangement of parts without departing from the spirit and scope of the invention as will now be understood by those skilled in the art. As pointed out before, varying the core areas is but one manner of accomplishing the novel results of the present invention. Similar results may be obtained, for example, by varying the rotor size in the transmitter relative to rotor size in the receiver, keeping the cross-sectional areas of the cores identical, or by operating the transmitter at a substantially different fundamental flux density from that of the receiver by changing the relative number of turns of the transmitter core winding 13 with respect to the indicator. All of the expedients mentioned have one thing in common and that is to provide a shift in the phase of the voltages induced in the transmitter winding with respect to the voltages induced in the receiver winding whereby the novel objects of the present invention are attained. For a definition of the limits of the invention, reference will be had primarily to the appended claims.

I claim:

1. In combination, a transmitter comprising first core means of magnetically permeable material arranged to be traversed by a uni-directional magnetic field for inducing a magnetic flux therein, a winding on said first core means having voltage induced therein upon relative displacement between said core means and said magnetic field, a receiver comprising second core means of magnetically permeable material, a winding on said second core means electrically connected with the winding on said first core means, a source of periodically varying current connected to energize both of said windings, a rotatable magnet associated in magnetic relation with said second core means and winding for actuation by the reaction between its own field and the field produced by said second winding upon relative angular displacement between said first core means and the field by which it is traversed, and means for causing a shift in the phase of the induced voltages in said first winding with respect to the voltages induced in said second winding.

2. In combination, a transmitter comprising first core means of magnetically permeable material arranged to be traversed by a uni-directional magnetic field for inducing a magnetic flux therein, a winding on said first core means having voltages induced therein upon relative motion between said core means and said magnetic field, a receiver comprising second core means of magnetically permeable material, a winding on said second core means electrically connected with the winding on said first core means, a source of periodically varying current connected to energize both of said windings whereby fundamental flux densities are developed in their respective core means, a rotatable magnet associated in magnetic relation with said second core means and winding for actuation by the reaction between its own field and the field produced by said second winding upon relative angular displacement between said first core means and the field by which it is traversed, and means for causing a difference in the time phase of the flux densities in the transmitter core means relative to the time phase of the flux densities in said receiver core means.

3. In combination, a transmitter comprising first core means of magnetically permeable material arranged to be traversed by a uni-directional magnetic field for inducing a magnetic flux therein, a winding on said first core means having voltages induced therein upon relative motion between said core means and said magnetic field, a receiver comprising second core means of magnetically permeable material, a winding on said second core means electrically connected with the winding on said first core means, a source of periodically varying current connected to energize both of said windings, and a rotatable magnet associated in magnetic relation with said second core means and winding for actuation by the reaction between its own field and the the field produced by said second winding upon relative angular displacement between said first core means and the field by which it is traversed, the winding on said first core means having a number of turns different from the turns of the winding on said second core means whereby the time phase of the fluid densities in said first core means is different from the time phase of the flux densities in said second core means.

4. In combination, a transmitter comprising first core means of magnetically permeable material arranged to be traversed by a uni-directional magnetic field for inducing a magnetic flux therein, a winding on said first core means having a plurality of connections intermediate its ends, a receiver comprising second core means of magnetically permeable material, a winding on said second core means and also having a plurality of connections intermediate its ends, the connections of said first winding being electrically connected to corresponding connections of said second winding, a source of periodically varying current connected to energize both of said windings, and a rotatable magnet associated in magnetic relation with said second core means and winding for actuation by the reaction between its own field and the field produced by said second winding upon relative angular displacement between said first core means and the field by which it is traversed, the cross-sectional area of said first core means being different from the cross-sectional area of said second core means.

5. In combination, a transmitter comprising first core means of magnetically permeable material arranged to be traversed by a uni-directional magnetic field for inducing a magnetic flux therein, a winding on said first core means having a plurality of connections intermediate its ends, a receiver comprising second core means of magnetically permeable material, a winding on said second core means and also having a plurality of connections intermediate its ends, the connections of said first winding being electrically connected to corresponding connections of said second winding, a source of periodically varying current connected to energize both of said windings, and a rotatable magnet associated in magnetic relation with said second core means and winding for actuation by the reaction between its own field and the field produced by said second winding upon relative angular displacement between said first core means and the field by which it is traversed, the cross-sectional area of said first core means being greater than the cross-sectional area of said second core means.

6. Means for transmitting angular motion from one point to another point, comprising a first relatively stationary core of magnetically permeable material at the first point, said core having a predetermined cross-sectional area, a coil wound on said core and having a plurality of taps, a rotatable magnet in magnetic relation with said core and coil, a second relatively stationary core of magnetically permeable material at said other point, said second core having a cross-section area less than the cross-sectional area of said first core, a coil wound on said second core and also having a plurality of taps corresponding to the number of taps on the coil of said first core, a rotatable magnet in magnetic relation with said second core and coil, means electrically connecting the taps of said first coil to the corresponding taps of said second coil, and a source of periodically varying current connected to energize both of said coils whereby upon rotation of the magnet at the first core, the magnet at the second core is correspondingly rotated.

7. In combination, a transmitter comprising first core means of magnetically permeable material arranged to be traversed by a uni-directional magnetic field for inducing a magnetic flux therein, said core means having a predetermined cross-section area, a winding on said first core means having voltages induced therein upon relative displacement between said core means and said magnetic field, a receiver comprising second core means of magnetically permeable material, said second core means having a cross-sectional area less than the cross-sectional area of said first core means, a winding on said second core means electrically connected with the winding on said first core means, a source of periodically varying current connected to energize both of said windings, and a rotatable magnet associated in magnetic relation with said second core means and winding for actuation by the reaction between its own field and the field produced by said second winding upon relative angular displacement between said first core means and the field by which it is traversed.

8. In a telemetric system, a transmitter device adapted for operation by a prime mover and having harmonic voltages developed thereat, a receiver device electrically connected to said transmitter device for actuation by the latter and also having harmonic voltages developed thereat, and means whereby the voltages developed at the transmitter are out of phase with the voltages developed at the receiver.

ROBERT S. CHILDS.

REFERENCES CITED

The following references are of record in the file of this patent:

UNITED STATES PATENTS

| Number | Name | Date |
|---|---|---|
| 2,342,637 | Bechberger | Feb. 29, 1944 |
| 2,176,101 | Riggs | Oct. 17, 1939 |